United States Patent
Mochizuki et al.

(10) Patent No.: US 10,698,899 B2
(45) Date of Patent: Jun. 30, 2020

(54) DATA PROCESSING METHOD, DATA PROCESSING DEVICE, STORAGE SYSTEM, AND METHOD FOR CONTROLLING STORAGE SYSTEM

(71) Applicant: Kabushiki Kaisha Toshiba, Mianto-ku (JP)

(72) Inventors: Shohei Mochizuki, Kawasaki (JP); Taiga Katayama, Ota (JP); Mototaka Kanematsu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 473 days.

(21) Appl. No.: 15/681,463

(22) Filed: Aug. 21, 2017

(65) Prior Publication Data
US 2018/0052846 A1  Feb. 22, 2018

(30) Foreign Application Priority Data
Aug. 22, 2016 (JP) .................... 2016-161889

(51) Int. Cl.
*G06F 16/20* (2019.01)
*G06F 16/2455* (2019.01)
(Continued)

(52) U.S. Cl.
CPC ........ *G06F 16/24552* (2019.01); *G06F 11/00* (2013.01); *G06F 12/0866* (2013.01); *G06F 2201/80* (2013.01)

(58) Field of Classification Search
None
See application file for complete search history.

(56) References Cited

U.S. PATENT DOCUMENTS 6,401,179 B1 * 6/2002 Park ................. G06F 11/1433
  711/165
6,799,206 B1 * 9/2004 Workman .......... G06F 11/1464
  709/223
(Continued)

FOREIGN PATENT DOCUMENTS

JP    3-266046 A    11/1991
JP    9-6656 A     1/1997
(Continued)

OTHER PUBLICATIONS

"TimesTen Application—Tier Database Cache"; http://www.oracle.com/technetwork/jp/products/timesten-imdb-cache-093743-ja.html, 5 pages (with Computer Generated English Translation).

*Primary Examiner* — Belix M Ortiz Ditren
(74) *Attorney, Agent, or Firm* — Oblon, McClelland, Maier & Neustadt, L.L.P.

(57) ABSTRACT

Any one of a first storage area and a second storage area, in which redundant data are respectively written, is set as a reference storage area, reference data are read in accordance with a request from the storage area set as the reference storage area between the first storage area and the second storage area, and, when update data are received from an external storage device, information based on the update data is written in the storage area not set as the reference storage area between the first storage area and the second storage area and the information based on the update data is written in the storage area set as the reference storage area.

10 Claims, 11 Drawing Sheets

(51) Int. Cl.
   *G06F 11/00*      (2006.01)
   *G06F 12/0866*   (2016.01)

(56) References Cited

U.S. PATENT DOCUMENTS

| | | | |
|---|---|---|---|
| 7,529,901 B2* | 5/2009 | Hirakawa | G06F 11/2074 711/112 |
| 2003/0065717 A1 | 4/2003 | Saito et al. | |
| 2004/0015504 A1 | 1/2004 | Ahad et al. | |
| 2008/0222111 A1* | 9/2008 | Hoang | G06F 16/21 |

FOREIGN PATENT DOCUMENTS

| | | |
|---|---|---|
| JP | 9-171480 A | 6/1997 |
| JP | 2003-108417 A | 4/2003 |
| JP | 3527834 | 5/2004 |
| JP | 4448444 | 4/2010 |

* cited by examiner

DATA PROCESSING METHOD, DATA PROCESSING DEVICE, STORAGE SYSTEM, AND METHOD FOR CONTROLLING STORAGE SYSTEM

BACKGROUND OF THE INVENTION

Field of the Invention

Embodiments of the present invention relate to a data processing method, a data processing device, a storage system, and a method for controlling a storage system.

Description of Related Art

Conventionally, a technology which disposes a relational data base management system (RDBMS) in the same machine as an application and executes a transaction by dynamically acquiring data necessary for the execution of the transaction from a data base of a back end layer has been known (for example, refer to Patent Document 1).

In addition, a technology which executes a client application by caching a table in which a portion of data stored on a server is processed in a client has been known (for example, refer to Patent Document 2).

In addition, a technology which disposes an RDBMS in a mobile device and caches data acquired from a server in the mobile device has been known (for example, refer to Patent Document 3).

In the technologies described in Patent Document 1, 2, and 3, bottleneck of latency in communication between the server and the client can be solved. However, a method of automatically reflecting an update of the server in a database on the client is not described in the technologies described in Patent Document 2 and 3. Moreover, in the technology of Patent Document 1, when an update in the server is automatically reflected in an RDBMS on the client, an update transaction occurs in the RDBMS on the client for this reflection. This update transaction causes a problem in which a reference transaction on the RDBMS on the client is hindered and latency increases when data are referred to.

PATENT DOCUMENTS

[Patent Document 1] United States Patent Application, Publication No. 2008-0222111
[Patent Document 2] Japanese Patent Publication No. 3527834
[Patent Document 3] Japanese Patent Publication No. 4448444

SUMMARY OF THE INVENTION

An object of the present invention is to provide a data processing method, a data processing device, a storage system, and a method for controlling a storage system which can suppress an increase in latency when data are referred to.

A data processing method of embodiments includes setting any one of a first storage area and a second storage area, in which redundant data are respectively written, as a reference storage area, reading reference data from a storage area set as the reference storage area between the first storage area and the second storage area in accordance with a request, and, when update data are received from an external storage device, writing information based on the update data in the storage area which is not set as the reference storage area between the first storage area and the second storage area, and writing the information based on the update data in the storage area set as the reference storage area.

DETAILED DESCRIPTION OF THE INVENTION

Hereinafter, a program, a data processing device, a storage system, and a method for controlling a storage system of embodiments will be described with reference to the drawings.

Figure 1:
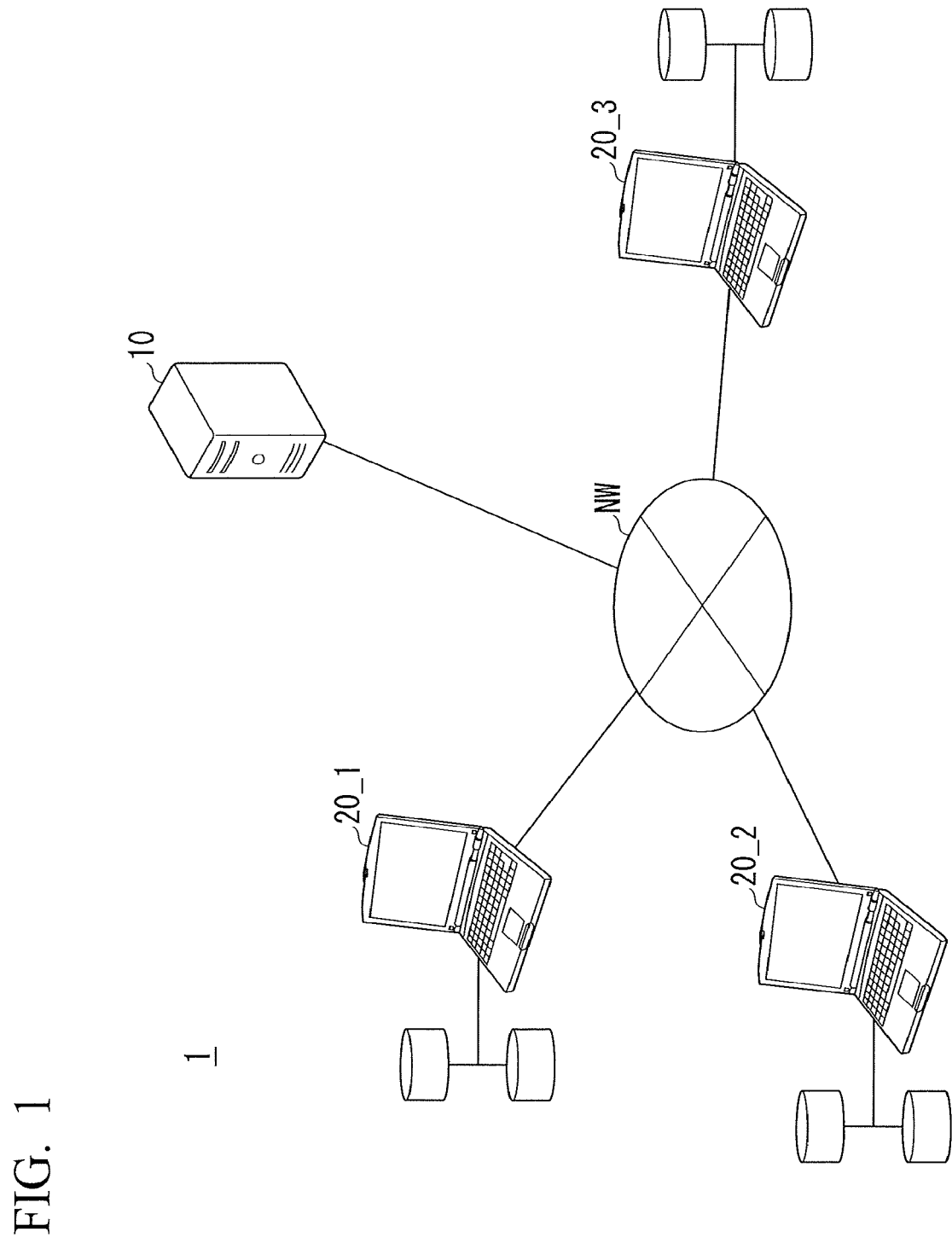
FIG. 1 is a diagram which shows an overall configuration of a storage system 1 according to an embodiment.

FIG. 1 is a diagram which shows an overall configuration of a storages system 1 according to an embodiment. The storage system 1 includes, for example, a server 10 and a plurality of clients 20-1, 20-2, and 20-3. These components are connected to be able to communicate with each other via a network NW. In the following description, the clients 20-1, 20-2, and 20-3 are simply referred to as a client 20 when there is no distinction. There is no particular restriction on the number of clients 20, and any number of clients 20 may be connected to the network NW.

The server 10 is an external storage device shared by a plurality of clients 20.

An embedded type RDBMS is disposed in the client 20. The embedded type RDBMS is an RDBMS which can be used as a library by being embedded in an application program in the client. At least some of data stored in a database on the server 10 side are cached in the library of the client 20. Accordingly, the application program in the client 20 may refer to the library of the client 20 instead of the database of the server 10, and thus it is possible to realize high-speed data processing.

Figure 2:
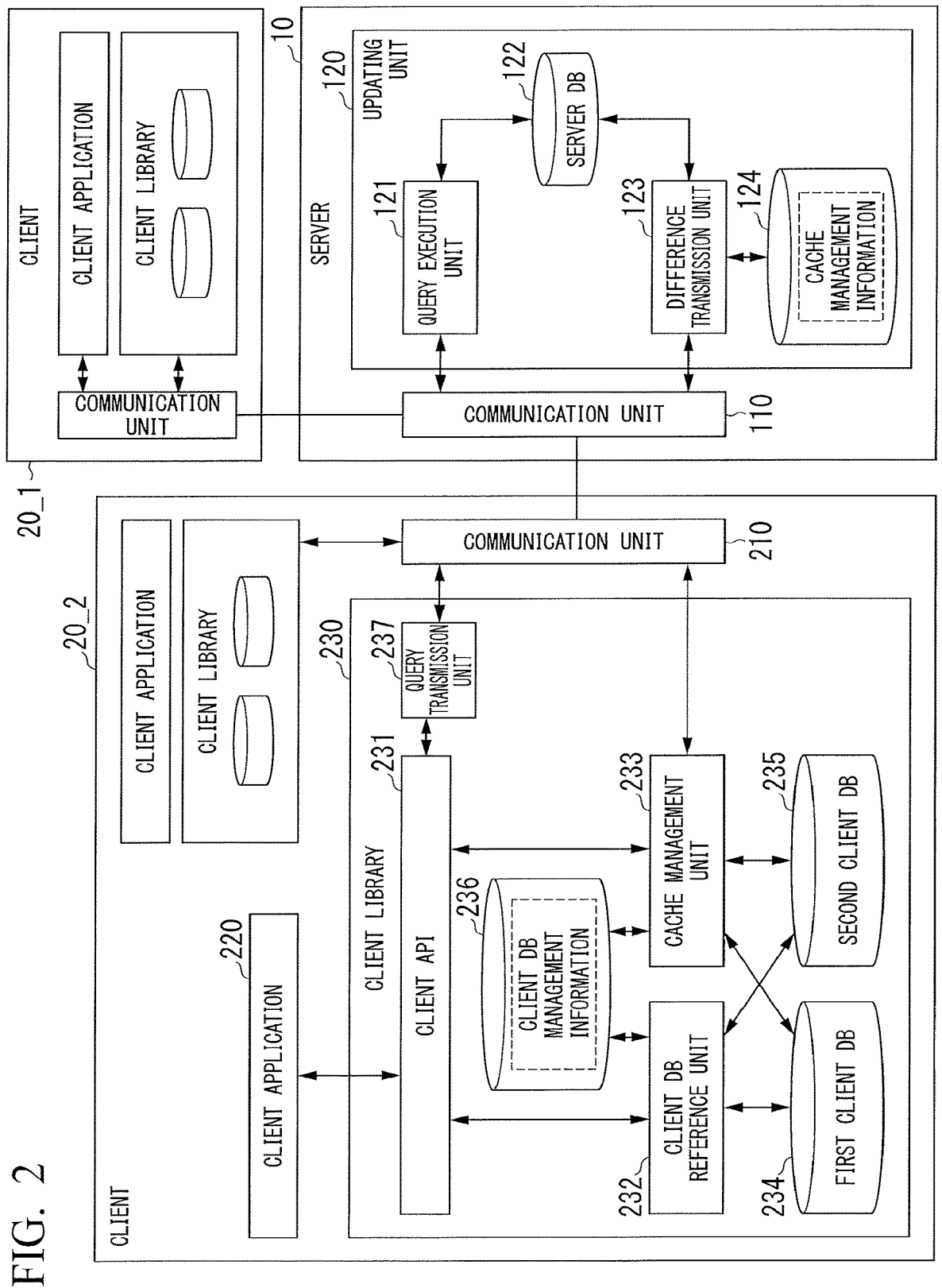
FIG. 2 is a block diagram which shows an example of functional configurations of a server 10 and a client 20.

Next, functional configurations of the server 10 and the client 20 will be described with reference to FIG. 2. FIG. 2 is a block diagram which shows an example of the functional configurations of the server 10 and the client 20. Each of the clients 20-1, 20-2, and 20-3 has the same functional configuration of a constituent for being used as a part of the storage system 1.

The server 10 includes, for example, a communication unit 110 and an updating unit 120. The communication unit 110 communicates with the client 20 via the network NW. The updating unit 120 includes, for example, a query execution unit 121, a server DB 122, a difference transmission unit 123, and a cache management information storage unit 124. The query execution unit 121 and the difference transmission unit 123 are realized by a program (software) being executed by a hardware processor such as a central processing unit (CPU). In addition, one or both of these may be realized by hardware such as large scale integration (LSI), an application specific integrated circuit (ASIC), or a field-programmable gate array (FPGA), and may also be realized by cooperation of software and hardware. The hardware may include a circuit section (circuitry).

The query execution unit 121 executes various types of processing for the server DB 122 on the basis of a query received from the client 20 via the communication unit 110. The query includes an update query for updating data. For example, when an update query is received from the client 20 to the server DB 122, the query execution unit 121 updates a table (hereinafter, referred to as a server table) stored in the server DB 122 on the basis of update data received together with the update query. In addition, the query execution unit 121 transmits a completion notification to the client 20 which transmitted the update query when the server table is updated.

The server DB 122 stores the server table. Data (hereinafter, referred to as shared data) shared by client applications on the plurality of clients 20-1, 20-2, and 20-3 are stored in the server table.

The difference transmission unit 123 executes cache construction processing and update request processing for the client 20 on the basis of the shared data stored in the server DB 122. For example, when a table name and a cache construction query are received from the client application of the client 20, the difference transmission unit 123 reads all information for constructing a cache of a specified table in the client 20 from the server DB 122 and returns the information to the client 20 which transmitted the cache construction query (cache construction processing). In addition, the difference transmission unit 123 transmits update data to the client 20 which did not transmit an update query when a server table of the server DB 122 is updated (update request processing).

The cache management information storage unit 124 stores information (hereinafter, referred to as cache management information) which manages shared data cached in each of the clients 20. The cache management information includes, for example, information in which the identification information of a corresponding client 20 and information indicating the shared data (table names, block names, record names, and the like) cached in the client 20 are associated with each other.

The client 20 includes a communication unit 210, a client application 220 executed by a processor (an example of computer) such as a CPU, and a client library 230. The communication unit 210 communicates with the other clients 20 and the server 10 via the network NW.

The client application 220 outputs a query to the client library 230 and calls a client API. The client application 220 outputs, for example, a reference query, a cache construction query, an update query, and the like to the client library 230. The reference query is a command which specifies a position at which data are read and a type of the data, and requests that data to be read (hereinafter, referred to as reference data) be read. The reference query is represented by a SELECT instruction or the like. The cache construction query is a command which acquires specified shared data from the server 10 and requests that the client library 230 perform cache construction. The update query is a command which requests that the shared data stored in the server 10 be changed. The update query is represented by INSERT, UPDATE, DELETE instructions, and the like. The reference query and the update query may be output as transaction including a series of queries in some cases.

The client library 230 caches (stores) the shared data received from the server 10 in each of two different client DBs (a first client DB 234 and a second client DB 235 and executes reference processing which reads reference data from the client DB according to the reference query and updating processing which writes update data instructed from the server 10 in both of the client DBs. Each of the first client DB 234 and the second client DB 235 has an assigned storage area, and pieces of processing are realized in the storage area assigned to each of the client DBs. The storage area is not necessarily set in a fixed manner and may be dynamically changed. Redundant data are written in each of the storage area assigned to the first client DB 234 and the storage area assigned to the second client DB 235. Writing data in the first client DB 234 or the second client DB 235 means writing data in the storage area assigned to the first client DB 234 or the second client DB 235. Moreover, reading data from the first client DB 234 or the second client DB 235 means reading data from the storage area assigned to the first client DB 234 or the second client DB 235. The client library 230 switches a client DB (hereinafter, referred to as a reference DB) on which the reference processing is performed and a client DB (hereinafter, referred to as an update DB) on which the updating processing is performed between the first client DB 234 and the second client DB 235. The reference DB is realized in a reference storage area. In addition, the update DB is realized in an update storage area. In the client library 230, one client DB among the first client DB 234 and the second client DB 235 is treated as the reference DB, and the other client DB is treated as the update DB. The client library 230 writes the update data in the client DB which is not set as the reference DB and sets the client DB in which the update data are written as the reference DB. As a result, as any client DB which is guaranteed to not have update data written therein is set as the reference DB, and the client application 220 can exclusively own the client DB set as the reference DB. Therefore, the reference processing is not disturbed by the updating processing and it is possible to suppress an increase in latency when data are referred to.

The client library 230 includes, for example, a client application programming interface (API) 231, a client DB reference unit 232, a cache management unit 233, the first client DB 234 and the second client DB 235 described above, a client DB management information storage unit 236, and a query transmission unit 237. The client library 230 is created for each client application 220.

The client API 231 instructs constituents in the client library 230 to perform various types of processing according to a query from the client application 220. The client API 231 is executed by a CPU, and thereby a client API execution unit is realized. For example, the client API 231 includes a reference query API, a cache construction API, and an update query API.

The reference query API instructs the client DB reference unit 232 or the query transmission unit 237 to perform reference processing to read specified reference data from the client application 220 according to a reference query and to transmit a command requesting that the reference data be read to the server 10. For example, the reference query API refers to a list of information (not illustrated) such as a table, a block, a record, and the like stored in the first client DB 234 and the second client DB 235 or accesses the first client DB 234 or the second client DB 235 to determine whether the reference data are stored in at least one of the first client DB 234 and the second client DB 235. When the reference data are not stored in at least one of the first client DB 234 and the second client DB 235, the reference query API instructs the query transmission unit 237 to transmit a command requesting that the reference data be read to the server 10.

When the reference data are stored in at least one of the first client DB 234 and the second client DB 235, the reference query API instructs the client DB reference unit 232 to perform reference processing to read the reference data.

The cache construction API requests all information for constructing a cache of a specified table in the client 20 from the server 10 according to a cache construction query from the client application 220, and instructs the cache management unit 233 to construct a cache on the basis of the information received from the server 10. The cache construction API causes all data stored in the server 10 in database units or some of the data stored in the server 10 in units such as table units, block units, record units, and the like to be cache constructed in the first client DB 234 and the second client DB 235.

The update query API instructs the query transmission unit 237 to transmit a command instructing that the shared data be changed to the server 10 according to an update query from the client application 220.

The client DB reference unit 232 (an example of a reference unit) executes the reference processing to read the reference data from the first client DB 234 or the second client DB 235 in accordance with an instruction from the reference query API. In addition, the client DB reference unit 232 executes switching processing to write information for switching between the reference DB and the update DB in the client DB management information storage unit 236. The switching processing by the client DB reference unit 232 will be described below with reference to FIG. 7.

The cache management unit 233 (an example of a management unit) executes processing to construct a cache in the first client DB 234 and the second client DB 235 according to an instruction of the client API 231 and the updating processing to write the update data in the first client DB 234 and the second client DB 235 according to an instruction of the server 10. Moreover, the cache management unit 233 executes the switching processing to write the information for switching between the reference DB and the update DB in the client DB management information storage unit 236. The switching processing by the cache management unit 233 will be described below with reference to FIG. 8.

The first client DB (an example of a first storage area) 234 and the second client DB (an example of a second storage area) 235 are caches which store some or all of the shared data stored in the server 10. The first client DB 234 and the second client DB 235 are realized by, for example, a RAM, a flash memory, an erasable programmable read only memory (EPROM), a hard disk, and the like.

The client DB management information storage unit 236 stores client DB management information. The client DB management information is information referred to when the first client DB 234 and the second client DB 235 are switched into the reference DB or the update DB. The client DB management information includes, for example, a next flag (next-db) and a read flag (read-db).

The next flag is a variable indicating a storage area (reference storage area) set for reference, for example. For example, the identification information of a client DB to be referred to in the next transaction by the client application 220 ("DB1" in the case of the identification information of the first client DB 234, "DB2" in the case of the identification information of the second client DB 235, and the like) is written in the next flag. In addition, the identification information of a client DB in which the update data are written is written in the next flag after updating processing by the cache management unit 233 is performed on each client DB.

The read flag is a variable indicating a read state of data by the client DB reference unit 232. For example, as the read flag, a variable (identification information) indicating a client DB referred to in the current transaction by the client application 220 or a variable (for example, a value indicating "non-reference" and the like) indicating that the client application 220 does not refer to the client DB is written in the read flag.

The query transmission unit 237 transmits a query requesting that the reference data be transmitted to the server 10 via the communication unit 210 according to an instruction from the application API 231.

Figure 3:
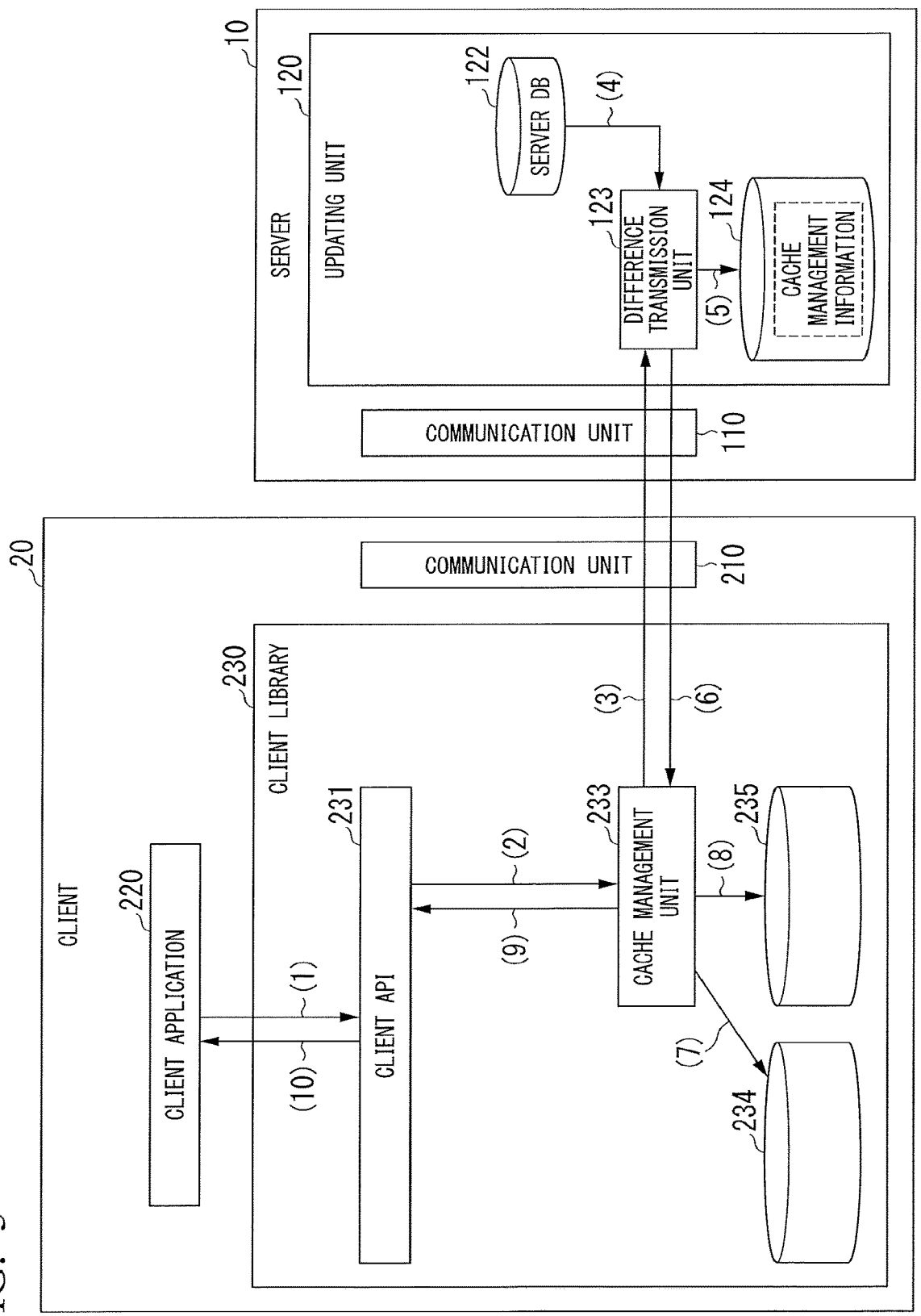
FIG. 3 is a diagram which describes a flow of cache construction processing.

Next, an example of the cache construction processing by the client application 220 will be described with reference to FIG. 3. FIG. 3 is a diagram which describes a flow of the cache construction processing. Illustrations of constituents not described herein will be omitted.

The client application 220 outputs, for example, a cache construction query in which a table t1 (cache-table) is specified (1). The client API 231 instructs the cache management unit 233 to perform cache construction of the table t1 according to the cache construction query (2). The cache management unit 233 transmits a table name (cache-table) and the cache construction query to the difference transmission unit 123 of the server 10 via the communication unit 210 (3).

The difference transmission unit 123 of the server 10 reads a schema and all records of the table t1 from the server DB 122 (4) and writes information showing that the table t1 is cached in the client 20 in the cache management information storage unit 124 (5). Subsequently, the difference transmission unit 123 transmits the schema and all records of the table t1, which are read, to the cache management unit 233 of the client 20 via the communication unit 110 (6).

The cache management unit 233 creates the table t1, and writes the table t1 in the first client DB 234 (7) and in the second client DB 235 (8) on the basis of information received from the server 10. The order of the processing of (7) and (8) may be any order, and may be simultaneous.

When writing processing ends, the cache management unit 233 outputs a completion notification to the client API 231 (9). In response to the notification, the client API 231 outputs the completion notification to the client application 220 (10).

Figure 4:
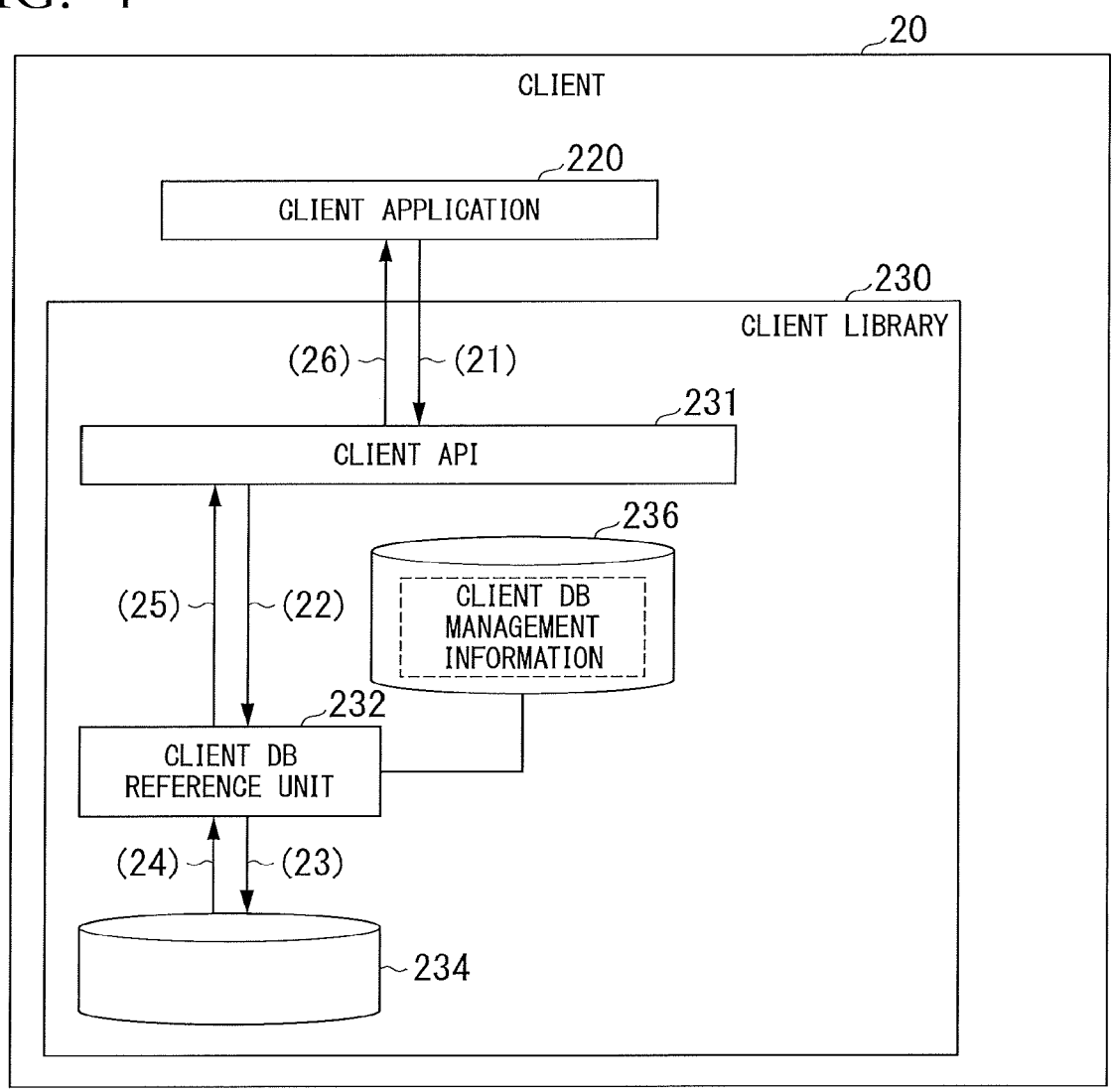
FIG. 4 is a diagram which describes a flow of reference processing by a client application 220.

Next, an example of the reference processing by the client application 220 will be described with reference to FIG. 4. FIG. 4 is a diagram which describes a flow of the reference processing by the client application 220. Illustrations of constituents not described herein will be omitted.

The client application 220 outputs a reference query related to a transaction to the client API 231 (21). The client API 231 instructs the client DB reference unit 232 to read shared data from all specified reference tables according to the reference query (22).

The client DB reference unit 232 refers to the client DB management information storage unit 236, selects a client DB described in a next flag between the first client DB 234 and the second client DB 235, and reads reference data from the selected client DB (23). An operation of the client DB reference unit 232 herein will be described below with reference to FIG. 7. In the illustrated example, the identification information of the first client DB 234 is described in the next flag, and thus the client DB reference unit 232 selects the first client DB 234.

The first client DB 234 outputs the result to the client DB reference unit 232 when the reading by the client DB reference unit 232 ends (24). The client DB reference unit 232 outputs the result input from the first client DB 234 to the client API 231 (25). The client API 231 outputs the result input from the client DB reference unit 232 to the client application 220 (26).

Figure 5:
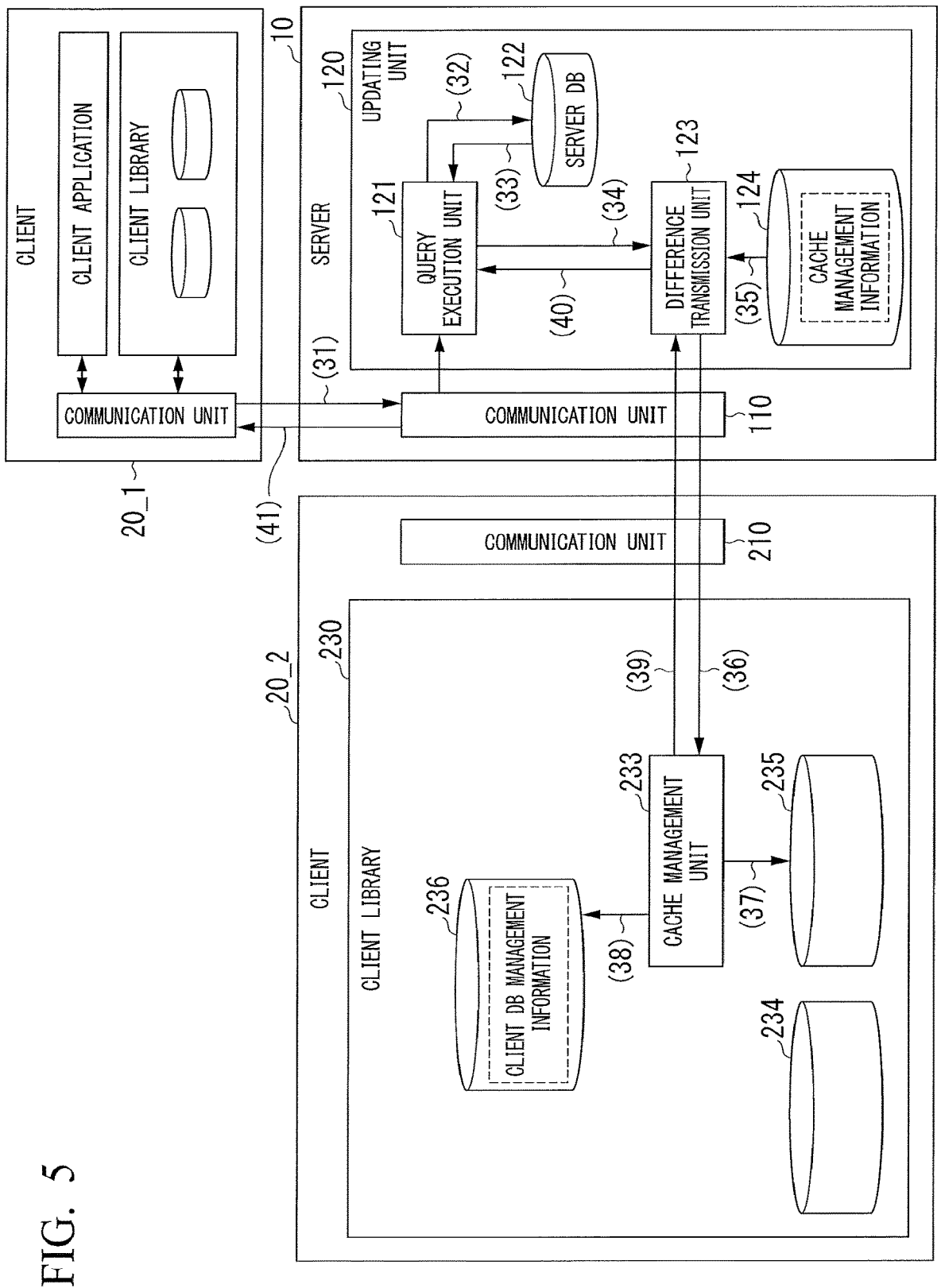
FIG. 5 is a diagram which describes a flow of synchronous series updating processing.
Figure 6:
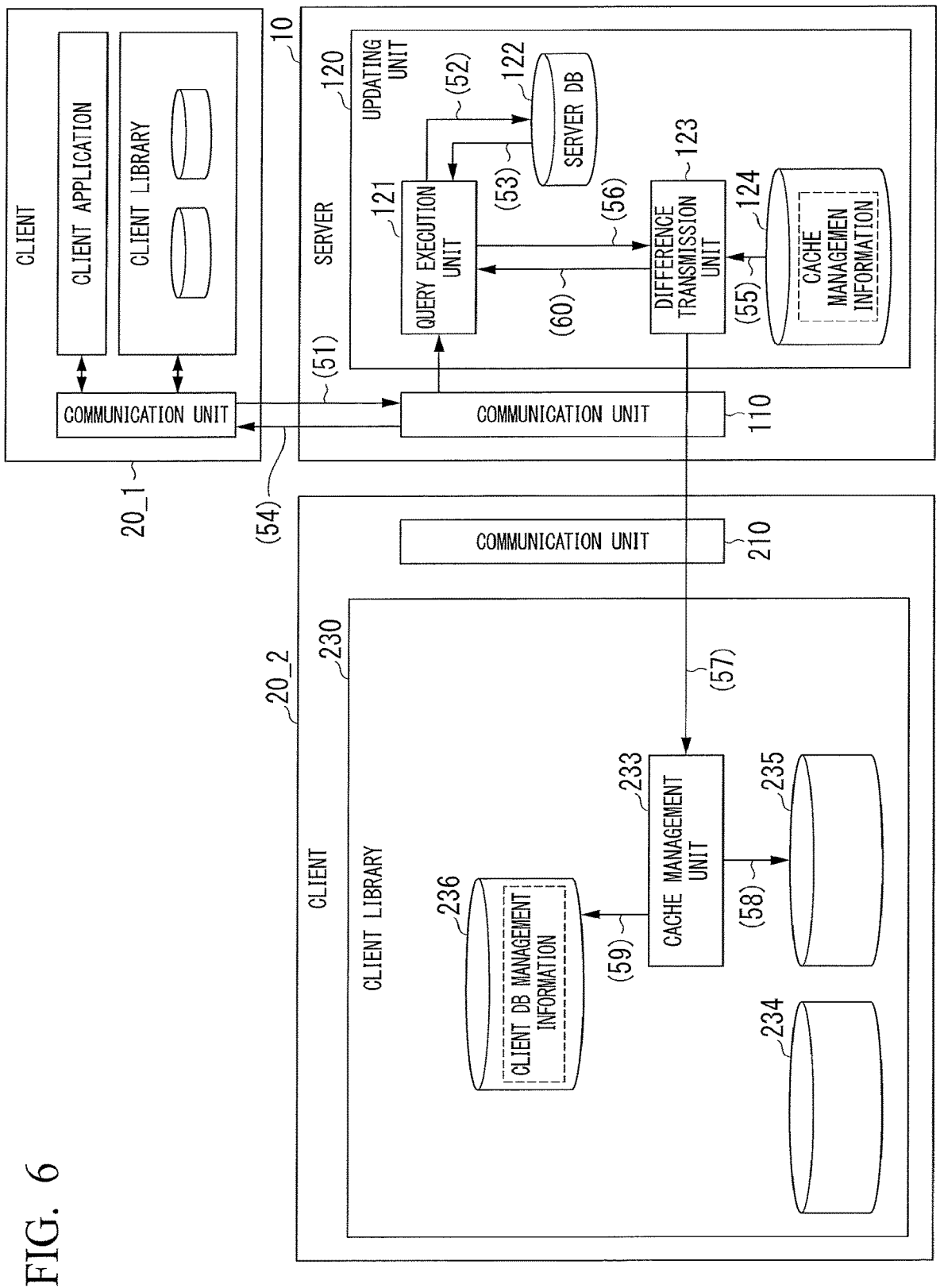
FIG. 6 is a diagram which describes a flow of asynchronous series updating processing.

Next, examples of the processing based on the update query and subsequent updating processing (hereinafter, collectively referred to as a series updating processing) will be described with reference to FIGS. 5 and 6. FIG. 5 is a diagram which describes a flow of a synchronous series updating processing. FIG. 6 is a diagram which describes a flow of an asynchronous series updating processing. Illustrations of constituents not described herein will be omitted. One of the synchronous series updating processing or the asynchronous series updating processing is selected and set by a user using the shared data.

First, the synchronous series updating processing will be described with reference to FIG. 5. The client 20-1 transmits the update data and the update query to the server 10 when the shared data in the client library is updated (31). When the update query is received, the query execution unit 121 of the server 10 updates a server table stored in the server DB 122 on the basis of the received update data (32). When writing by the query execution unit 121 ends, the server DB 122 outputs a result of the writing to the query execution unit 121 (33).

The query execution unit 121 outputs the update data written in the server DB 122 to the difference transmission unit 123 (34). The difference transmission unit 123 refers to the cache management information storage unit 124 and acquires table names updated in the server DB 122 (35). Here, the difference transmission unit 123 refers to the cache management information storage unit 124 and determines the client 20-2 in which a cache of the table updated in the server DB 122 is constructed as an object to be instructed to perform the updating processing. The difference transmission unit 123 transmits update data to the client library 230 of the client 20-2 and instructs the client 20-2 to perform the updating processing (36).

When the update data are received from the server 10 via the communication unit 210, the cache management unit 233 of the client 20-2 writes the received update data in a client DB not described in a next flag (37). In the illustrated example, since the identification information of the first client DB 234 is described in the next flag, the cache management unit 233 writes the update data in the second client DB 235. When the writing of the update data in the second client DB 235 ends, the cache management unit 233 writes the identification information of the second client DB 235 in the next flag (38). Next, the cache management unit 233 also writes the received update data in the first client DB 234.

Subsequently, the cache management unit 233 transmits an OK notification indicating that the update data are updated in the cache to the server 10 via the communication unit 210 (39). Processing to transmit the OK notification may be performed at a time at which the writing of the update data in the second client DB 235 ends. If the OK notification is received from the client 20-1 via the communication unit 110, the difference transmission unit 123 of the server 10 outputs the received OK notification to the query execution unit 121 (40). The query execution unit 121 transmits the OK notification to the client 20-1, which transmitted the update query, on the basis of the input OK notification (41).

As described above, in the synchronous series updating processing, the server 10 writes the update data in the client DB of the client 20 on which the updating processing is performed, and then returns the OK notification to the client 20 which transmitted the update query. With such a configuration, when the server 10 transmits the OK notification to the client 20 from which the update query is transmitted, the update data are guaranteed to be written in the client DB of another client 20. In addition, it is possible to reduce a deviation in storage contents between the server DB 122 and the client DB.

Next, the asynchronous series updating processing will be described with reference to FIG. 6. When the shared data in the client library is updated, the client 20-1 transmits the updated update data and an update query to the server 10 (51). When the update query is received, the query execution unit 121 of the server 10 updates the server table stored in the server DB 122 on the basis of the received update data (52). If writing by the query execution unit 121 ends, the server DB 122 outputs a result of the writing to the query execution unit 121 (53). The query execution unit 121 outputs a completion notification indicating that the writing of update data ends to the client 20-1 (54).

On the other hand, the difference transmission unit 123 monitors whether there is an update to the server table.

When the server table is updated, the difference transmission unit 123 refers to the cache management information storage unit 124 and acquires a name of the updated table in the server DB 122 (55). Here, the difference transmission unit 123 refers to the cache management information storage unit 124 and determines the client 20-2 in which a cache of the updated table is constructed in the server DB 122 as an object on which updating processing is performed. The difference transmission unit 123 reads update data written in the server DB 122 from the server DB 122 (56), and transmits the update data to the client library 230 of the client 20-2 and instructs the client library to execute the updating processing (57).

If the update data from the server 10 are received via the communication unit 210, the cache management unit 233 of the client 20-2 writes the received update data in a client DB not described in the next flag (58). Since the identification information of the first client DB 234 is described in the next flag in the illustrated example, the cache management unit 233 writes the update data in the second client DB 235. When the writing of the update data in the second client DB 235 ends, the cache management unit 233 writes the identification information of the second client DB 235 in the next flag (59). Next, the cache management unit 233 also writes all of the received update data in the first client DB 234.

As described above, in the asynchronous series updating processing, the server 10 returns an OK notification to the client 20 which transmitted the update query at the time at which the writing of update data in the server DB 122 ends. With such a configuration, it is possible to improve apparent responsiveness seen from the client 20 from which the update query is transmitted.

Figure 7:
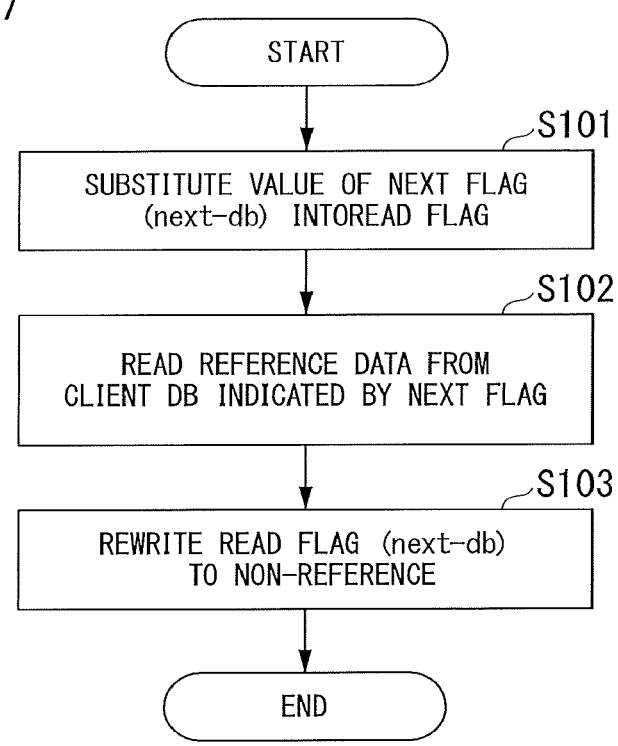
FIG. 7 is a flowchart which shows an example of a flow of processing by a client DB reference unit 232 during reference query execution.

Next, a flow of the processing by the client DB reference unit 232 at the time of reference query execution will be described with reference to FIG. 7. FIG. 7 is a flowchart which shows an example of the flow of the processing by the client DB reference unit 232 at the time when a reference query is executed.

When reference processing is instructed by a client API, the client DB reference unit 232 writes information indicating a client DB from which reference data are read based on the reference processing in a read flag. For example, the client DB reference unit 232 refers to the client DB management information storage unit 236, copies identification information of a client DB written in a next flag, and writes the identification information in the read flag (step S101).

Then, the client DB reference unit 232 reads reference data from the client DB written in the next flag (step S102). Thereafter, when the reference processing ends, the client DB reference unit 232 rewrites the read flag to "non-reference" (step S103).

Figure 8:
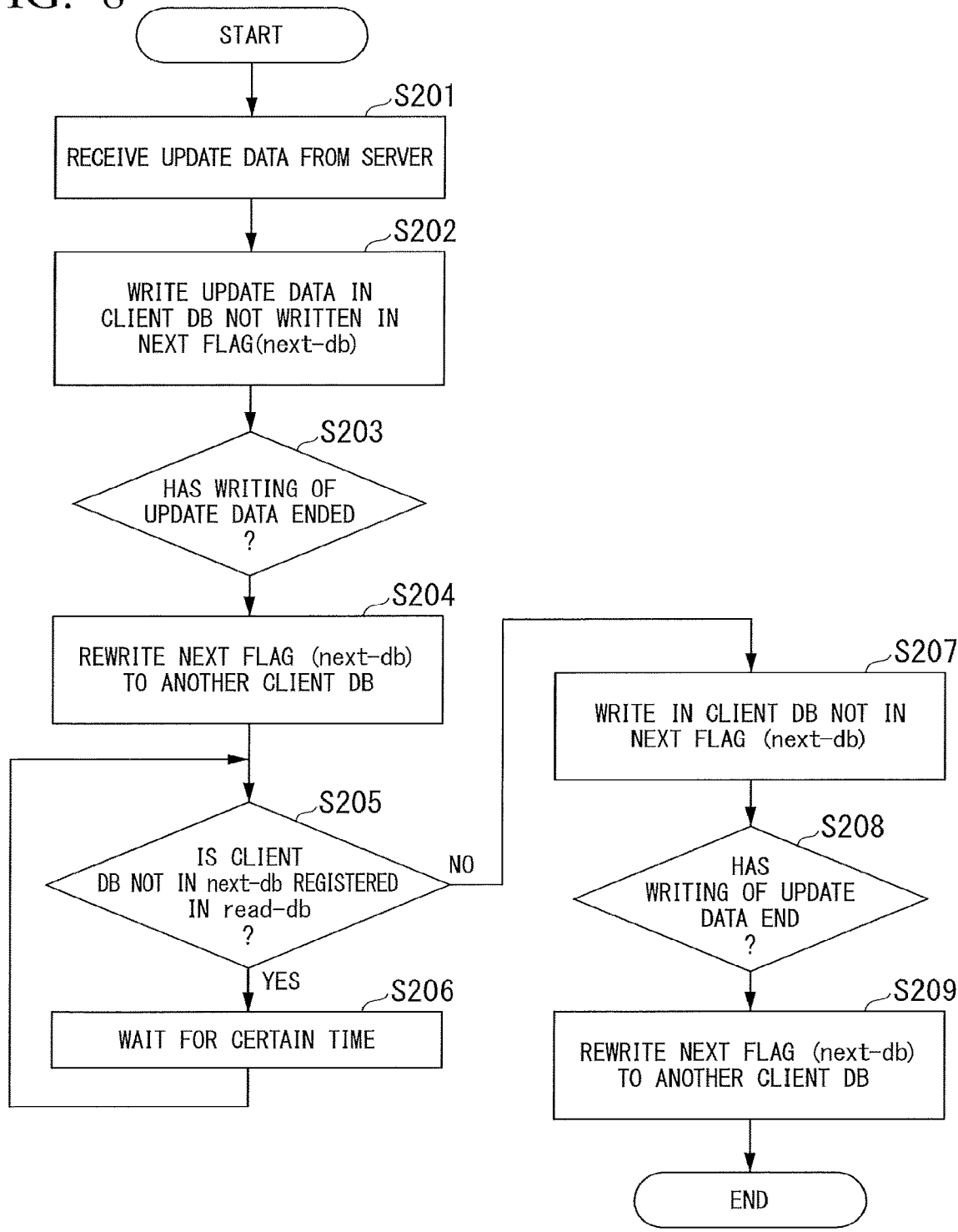
FIG. 8 is a flowchart which shows an example of a flow of updating processing and rewriting processing by a cache management unit 233.

Next, a flow of updating processing and rewriting processing by the cache management unit 233 will be described with reference to FIG. 8. FIG. 8 is a flowchart which shows an example of the flow of the updating processing and the rewriting processing by the cache management unit 233.

The cache management unit 233 receives update data from the server 10 (step S201), and refers to the client DB management information storage unit 236 and write the update data in a client DB which is not a client DB written in a next flag (step S202). Next, the cache management unit 233 determines whether writing of the update data ends (step S203). When the writing of the update data ends, the cache management unit 233 rewrites a variable of the next flag in the identification information of the client DB which is not the client DB written in the next flag (that is, the client DB in which the update data are written) (step S204).

Next, the cache management unit 233 refers to the client DB management information storage unit 236 and determines whether the client DB which is not the client DB written in the next flag is written in a read flag (step S205). That is, the cache management unit 233 determines whether a client DB in which the update data are not yet written is in the reference processing by the client DB reference unit 232.

When the client DB which is not the client DB written in the next flag is written in the read flag (that is, when the client DB in which the update data are not yet written is under the reference processing by client DB reference unit 232), the cache management unit 233 waits for a certain time (step S206).

On the other hand, in step S205, when the client DB which is not the client DB written in the next flag is not written in the read flag (including a case in which the reference processing by the client DB reference unit 232 ends by the waiting in step S205), the cache management unit 233 writes the update data in the client DB which is not the client DB written in the next flag (that is, the client DB in which the update data are not yet written) (step S207).

Next, the cache management unit 233 determines whether the writing of the update data ends (step S208). When the writing of the update data ends, the cache management unit 233 rewrites the variable of the next flag in the identification information of the client DB which is not the client DB written in the next flag (that is, the client DB in which the update data are written) (step S209).

Next, a flow of processing by the cache management unit 233 will be described with reference to FIG. 9.

Figure 9:
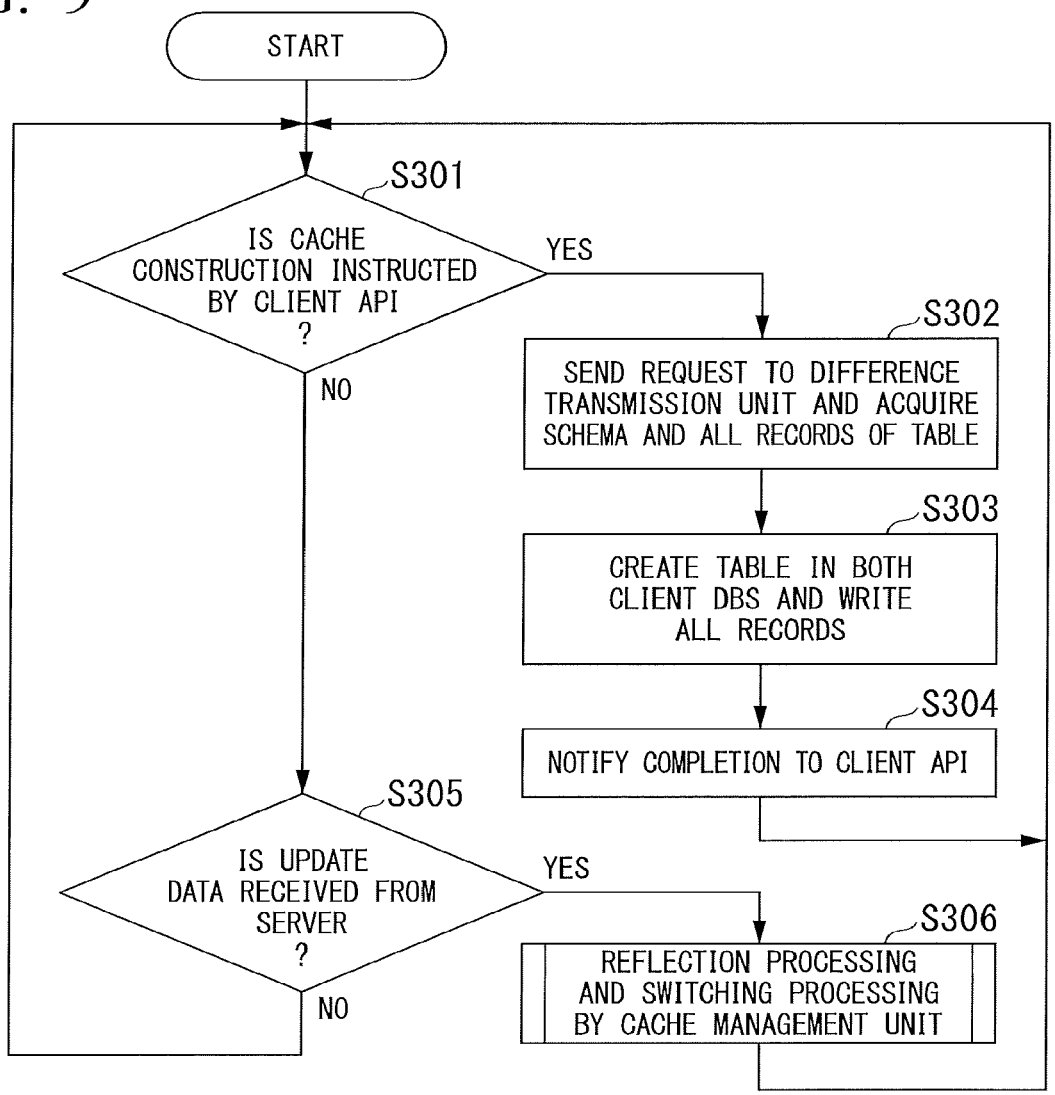
FIG. 9 is a flowchart which shows an example of a flow of processing by the cache management unit 233.

FIG. 9 is a flowchart which shows an example of the flow of the processing by the cache management unit 233.

Here, an example in which the cache management unit 233 executes asynchronous series updating processing will be described.

The cache management unit 233 determines whether cache construction is instructed by the client API 231 (step S301). When cache construction is instructed by the client API 231, the cache management unit 233 requests all information for constructing a cache of a specified table (for example, the table t1) in the client 20 from the difference transmission unit 123 of the server 10 and acquires a schema and all records of the table t1 (step S302).

The cache management unit 233 creates the table t1 in both client DBs (the first client DB 234 and the second client DB 235) on the basis of the information acquired from the difference transmission unit 123 of the server 10, and writes all of the records (step S303). The cache management unit 233 outputs a completion notification to the client API 231 (step S304).

On the other hand, in step S301, when cache construction is not instructed, the cache management unit 233 determines whether update data are received from the server 10 (step S305). When the update data are received, the cache management unit 233 executes the processing by the cache management unit 233 described with reference to FIG. 8 (step S306).

Figure 10:
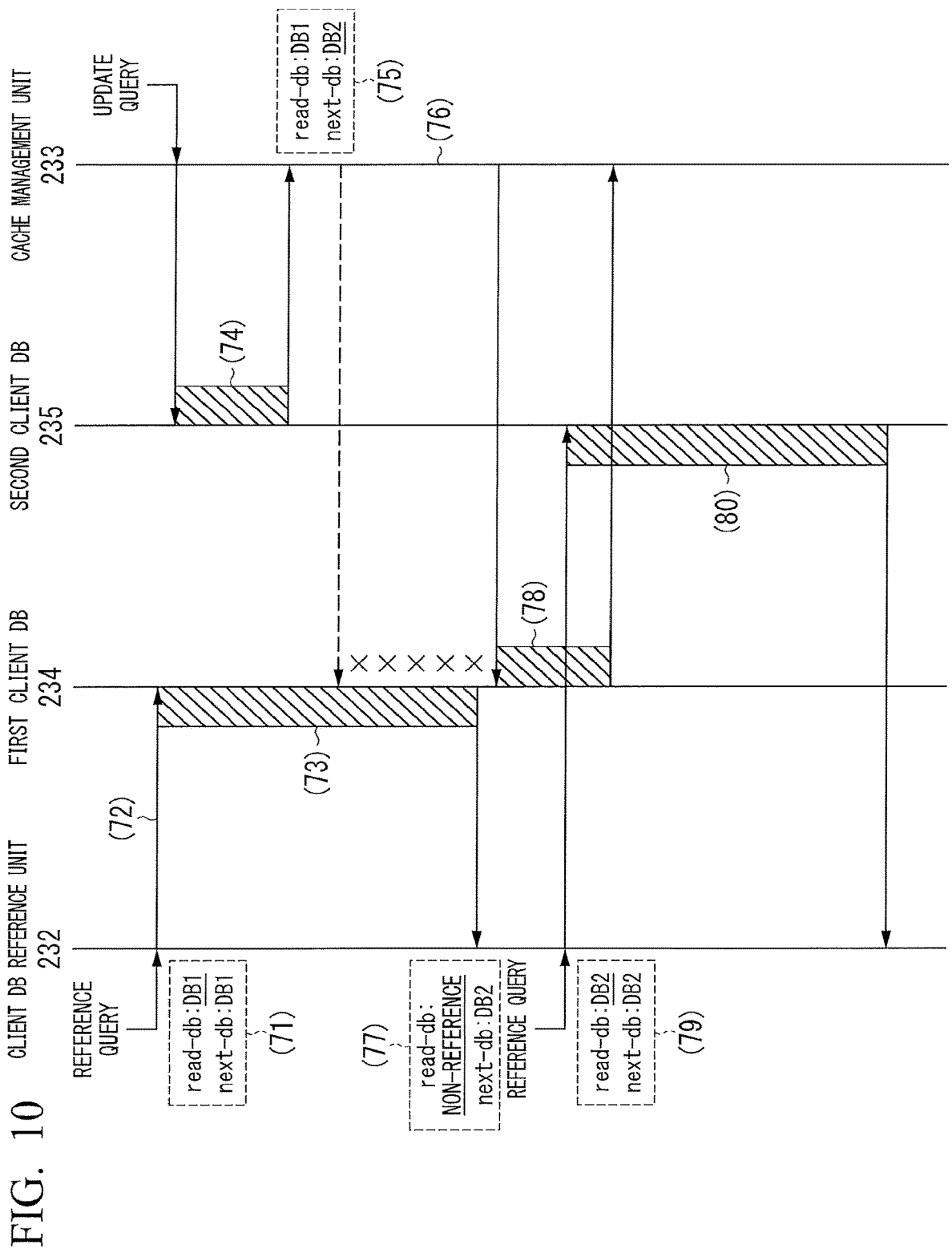
FIG. 10 is a sequence diagram which shows an example of processing timings of the client DB reference unit 232 and the cache management unit 233.

Next, switching processing in a client DB will be described with reference to FIGS. 10 and 11. FIG. 10 is a sequence diagram which shows an example of processing timings of the client DB reference unit 232 and the cache management unit 233. FIG. 11 is a diagram which shows an example of changes in client DB management information in the processing shown in FIG. 10.

As shown in FIG. 10, first, it is assumed that a reference query related to a transaction occurs. In this case, the client DB reference unit 232 refers to the client DB management information storage unit 236 and writes a client DB described in a next flag in a read flag. For example, when "DB1" is described in the next flag, the client DB reference unit 232 writes "DB1" in the read flag (71). Subsequently, the client DB reference unit 232 reads reference information from the client DB described in the read flag. Since "DB1" is described in the read flag, the client DB reference unit 232 refers to the first client DB 234 and starts reading the reference data over all reference tables specified in the reference query (72).

Figure 11A:
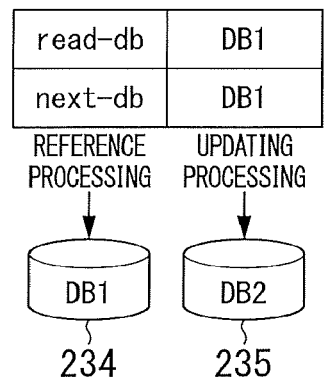
FIG. 11A is a diagram which shows an example of changes in client DB management information in the processing shown in FIG. 10.

While a transaction is executed in the client 20 (73), it is assumed that an update query occurs. At this time, the cache management unit 233 refers to the client DB management information storage unit 236 and determines whether a client DB which is not the client DB written in the next flag is indicated by the read flag. As described above, "DB1" in the next flag and "DB1" in the read flag are described. For this reason, when the cache management unit 233 determines that a client DB which is not the client DB written in the next flag is not indicated by the read flag, update data are written in the second client DB 235 which is not indicated by "DB1" in the next flag (74). This state is shown in FIG. 11A.

Figure 11B:
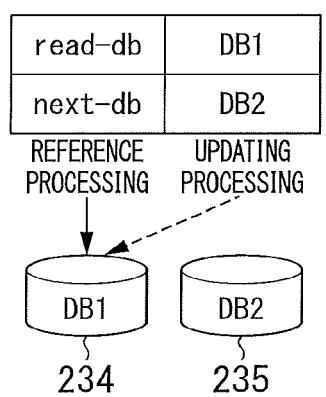
FIG. 11B is a diagram which shows an example of changes in client DB management information in the processing shown in FIG. 10.

When the writing of update data ends, the cache management unit 233 rewrites the next flag from "DB1" to "DB2" (75). Next, the cache management unit 233 refers to the client DB management information storage unit 236 and determines whether the client DB which is not the client DB written in the next flag is written in the read flag. As described above, "DB1" in the next flag and "DB2" in the read flag are described. For this reason, the cache management unit 233 determines that the client DB which is not the client DB written in the next flag is written in the read flag and waits for a certain time (76). This state is shown in FIG. 11B.

Figure 11C:
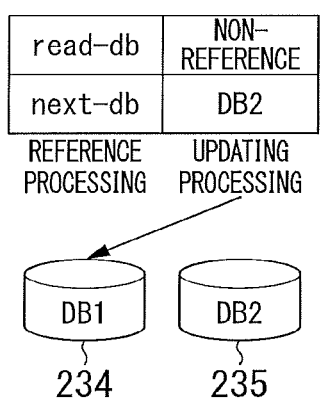
FIG. 11C is a diagram which shows an example of changes in client DB management information in the processing shown in FIG. 10.

On the other hand, the client DB reference unit 232 rewrites the read flag to "non-reference" when the reading of all of the reference information ends over all of the reference tables specified in the reference query (77). As a result, since the client DB which is not the client DB written in the next flag is not written in the read flag, the client DB reference unit 232 stops waiting and writes the update data in the first client DB 234 which is not the next flag "DB2" (78). This state is shown in FIG. 11C.

Figure 11D:
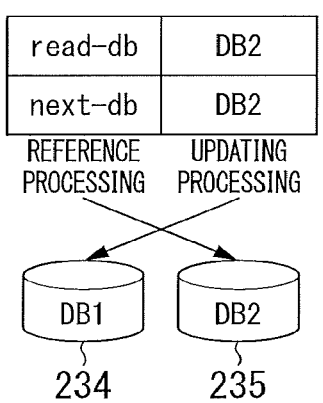
FIG. 11D is a diagram which shows an example of changes in client DB management information in the processing shown in FIG. 10.

Further, while the cache management unit 233 executes writing in the first client DB 234, it is assumed that the reference query occurred. In this case, the client DB reference unit 232 refers to the client DB management information storage unit 236 and writes the client DB written in the next flag in the read flag (79). Here, since "DB2" is described in the next flag, the client DB reference unit 232 rewrites "non-reference" of the read flag to "DB2". Subsequently, the client DB reference unit 232 reads reference data from the client DB written in the read flag (80). Since "DB2" is described in the read flag, the client DB reference unit 232 refers to the second client DB 235 and reads reference data over all of the reference tables specified in the reference query. This state is shown in FIG. 11D.

As described above, according to the client 20 of the present embodiment, even when reading processing related to an application and writing processing of update data occur at the same time, each piece of processing can be executed in parallel using another client DB, and thus an increase in latency can be avoided.

For example, according to the client 20 of the present embodiment, since a client DB updated with update data is set as a next reference DB, it is possible to refer to shared data which will be promptly updated at a time of the next reference. In addition, this is particularly effective when reading processing of data according to an application is a process related to a transaction. This is because, even if one client DB is being read, update data may be written in another client DB. In addition, even if writing of update data frequently occurs, reference data may be read from another client DB, and thus a probability that reading processing related to an application is hindered by updating processing is reduced.

In addition, according to the client 20 of the present embodiment, the client 20 includes two client DBs, thereby suppressing an increase in latency due to locking when compared with a machine having only one client DB. This is because it is necessary to lock each table and each row until a transaction ends in the machine with one client DB, but it is necessary to lock only at a start and an end of the transaction in the client 20 (at the time of rewriting the read flag).

In addition, according to the client 20 of the present embodiment, the client DB reference unit 232 reads reference data from a reference DB indicated by a next flag and registers that the reference data are read from the reference DB in a read flag. As a result, the cache management unit 233 can determine which client DB is an update DB by referring to the next flag, and determine whether a client DB is being read by referring to the read flag.

In addition, according to the client 20 of the present embodiment, the cache management unit 233 updates update data in a client DB which is not a reference DB by referring to a next flag and switches the client DB updated with the update data to the reference DB. Therefore, the cache management unit 233 can write the update data in a client DB in which the client DB reference unit 232 is not likely to perform reading, and the client DB reference unit 232 can read reference data from a client DB in which the cache management unit 233 is not likely to perform writing.

In addition, according to the client 20 of the present embodiment, the cache management unit 233 refers to a next flag and a read flag, thereby determining whether reading reference data from a client DB updated with update data next time is being performed and updating the client DB with update data after the reading of the reference data ends.

The present invention is not limited to the embodiments described above. For example, the client API 231 may instruct the query transmission unit 237 to read reference data from the server 10 in a predetermined case even when a reference table is cached in a client DB. Accordingly, this is beneficial for transactions in which consistency is important.

According to at least one of the embodiments described above, it is possible to suppress an increase in latency by setting any one of a first storage area and a second storage area, in which redundant data are respectively written, as a reference storage area, reading reference data in accordance with a request from the storage area set as the reference storage area between the first storage area and the second storage area, writing information based on update data in the storage area which is not set as the reference storage area between the first storage area and the second storage area when the update data are received from an external storage device, and then writing the information based on the update data in the storage area set as the reference storage area.

Several embodiments of the present invention have been described, but these embodiments have been presented as examples and are not intended to limit the scope of the invention. These embodiments can be implemented in various other forms. Various omissions, substitutions, and changes can be made in a range not departing from the gist of the invention. These embodiments and modifications thereof are included in the invention described in the claims and a scope equivalent thereto in addition to being included in the scope and the gist of the invention.

EXPLANATION OF REFERENCES

1 Storage system
10 Server
20 Client
110 Communication unit
120 Updating unit
121 Query execution unit
122 Server DB
123 Difference transmission unit
124 Cache management information storage unit
210 Communication unit
220 Client application
230 Client library 231 Client API
232 Client DB reference unit
233 Cache management unit
234 First client DB
235 Second client DB
236 Client DB management information storage unit
237 Query transmission unit

What is claimed is:

1. A data processing method comprising:
setting one of a first storage area and a second storage area, in which redundant data are respectively written, as a reference storage area;
reading reference data from the storage area set as the reference storage area between the first storage area and the second storage area in accordance with a request;
writing, when update data are received from an external storage device, information based on the update data in the first or second storage area which is not set as the reference storage area between the first storage area and the second storage area, and writing the information based on the update data in the storage area set as the reference storage area;
generating a read request, and referring to a next flag indicating the storage area set as the reference storage area between the first storage area and the second storage area;
reading the reference data from the storage area indicated by the next flag between the first storage area and the second storage area; and
rewriting a read flag indicating a read state of the reference data in information indicating the storage area from which the reference data are read;
wherein the information based on the update data is written in the storage area which is not indicated by the next flag between the first storage area and the second storage area when the update data are received, and
after the writing of information based on the update data in the storage area not indicated by the next flag between the first storage area and the second storage area ends, the next flag is rewritten to information indicating the storage area in which the writing of the information based on the update data ends.

2. The data processing method according to claim 1, further comprising:
writing of information based on the update data in the storage area which is set as the reference storage area and from which the reference data are read, and
waiting until the reading of the reference data from the storage area set as the reference storage area ends, and, after the reading of the reference data from the storage area set as the reference storage area ends, writing of information based on the update data in the storage area set as the reference storage area.

3. The data processing method according to claim 1, wherein, after the writing of information based on the update data in the first storage area or the second storage area ends, the storage area in which the information based on the update data is written is set as the reference storage area.

4. The data processing method according to claim 1, further comprising:
determining whether the reference data are stored in the first storage area or the second storage area in accordance with a request from an application, and
reading the reference data from the external storage device when the reference data are not stored in the first storage area or the second storage area.

5. The data processing method according to claim 1, wherein all data stored in the external storage device are cache constructed in the first storage area and the second storage area in database units, or some of the data stored in the external storage device are cache constructed therein in table units, block units, or record units.

6. A data processing method comprising:
setting one of a first storage area and a second storage area, in which redundant data are respectively written, as a reference storage area;
reading reference data from the storage area set as the reference storage area between the first storage area and the second storage area in accordance with a request; and
writing, when update data are received from an external storage device, information based on the update data in the storage area which is not set as the reference storage area between the first storage area and the second storage area, and writing the information based on the update data in the storage area set as the reference storage area;
generating a read request, and referring to a next flag indicating the storage area set as the reference storage area between the first storage area and the second storage area;
reading the reference data from the storage area indicated by the next flag between the first storage area and the second storage area;
rewriting a read flag indicating a read state of the reference data in information indicating the storage area from which the reference data are read; and
determining whether the storage area not indicated by the next flag between the first storage area and the second storage area is indicated by the read flag, and
when the storage area not indicated by the next flag between the first storage area and the second storage area is indicated by the read flag, waiting until the reading from the storage area indicated by the read flag between the first storage area and the second storage area ends, and
when the storage area not indicated by the next flag between the first storage area and the second storage area is not indicated by the read flag, the information based on the update data is written in the storage area indicated by the next flag between the first storage area and the second storage area.

7. The data processing method according to claim 6, further comprising:
writing of information based on the update data in the storage area which is set as the reference storage area and from which the reference data are read is performed, and
waiting until the reading of the reference data from the storage area set as the reference storage area ends, and, after the reading of the reference data from the storage area set as the reference storage area ends, writing of information based on the update data in the storage area set as the reference storage area.

8. The data processing method according to claim 6, wherein, after the writing of information based on the update data in the first storage area or the second storage area ends, the storage area in which the information based on the update data is written is set as the reference storage area.

9. The data processing method according to claim 6, further comprising:

determining whether the reference data are stored in the first storage area or the second storage area in accordance with a request from an application, and reading the reference data from the external storage device when the reference data are not stored in the first storage area or the second storage area.

10. The data processing method according to claim 6, wherein all data stored in the external storage device are cache constructed in the first storage area and the second storage area in database units, or some of the data stored in the external storage device are cache constructed therein in table units, block units, or record units.

* * * * *